United States Patent
Bala et al.

(10) Patent No.: US 6,804,345 B1
(45) Date of Patent: Oct. 12, 2004

(54) VIRTUAL CONTACT CENTER WITH FLEXIBLE STAFFING CONTROL

(75) Inventors: Srinivas Bala, Dayton, NJ (US); Mark Jeffrey Foladare, Kendall Park, NJ (US); Kathleen C. Fowler, Manasquan, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/492,594

(22) Filed: Jan. 27, 2000

Related U.S. Application Data (63) Continuation-in-part of application No. 08/933,518, filed on Sep. 18, 1997, now Pat. No. 6,049,602, which is a continuation-in-part of application No. 09/318,015, filed on Mar. 25, 1999.

(51) Int. Cl.[7] .......................... H04M 3/00; H04M 5/00
(52) U.S. Cl. ............................ 379/265.04; 379/266.08
(58) Field of Search ..................... 379/265.02–265.04, 379/266.01, 266.04, 266.08, 266.09, 309

(56) References Cited

U.S. PATENT DOCUMENTS

| | | | |
|---|---|---|---|
| 5,392,342 A | | 2/1995 | Rosenthal |
| 5,459,780 A | * | 10/1995 | Sand ..................... 379/266.09 |
| 5,608,782 A | | 3/1997 | Carlsen et al. |
| 5,644,626 A | | 7/1997 | Carlsen et al. |
| 5,664,003 A | | 9/1997 | Foladare et al. |
| 5,703,930 A | | 12/1997 | Miska et al. |
| 5,742,906 A | | 4/1998 | Foladare et al. |
| 5,745,689 A | | 4/1998 | Yeager et al. |
| 5,805,991 A | | 9/1998 | Foladare et al. |
| 5,815,566 A | * | 9/1998 | Ramot et al. .......... 379/210.01 |
| 5,864,617 A | * | 1/1999 | Donnelly ................ 379/266.07 |
| 5,903,641 A | * | 5/1999 | Tonisson ................ 379/265.12 |
| 5,942,986 A | | 8/1999 | Shabot et al. |
| 5,999,965 A | * | 12/1999 | Kelly ......................... 709/202 |

* cited by examiner

Primary Examiner—Benny Tieu
(74) Attorney, Agent, or Firm—William Ryan (57) ABSTRACT

Paging, cellular telephone or other messaging functionality is incorporated into a virtual contact center system to permit logged-off customer service representatives (CSRs) to be alerted to a need to logon to the system, and to permit CSRs to alert supervisors or specialists to logon to the system. Matching at a contact control server of existing conditions to predetermined criteria, e.g., failure to login at an assigned time, or specified network conditions (such as length of customer queues), triggers a command for a communication to one or more logged-off CSRs. Results of follow-up testing at the contact control server for matches causes page requests to be renewed, redirected or canceled. Unusual contact requirements or emerging network conditions requiring supervisory input or increased monitoring by traffic or subject matter specialists is likewise triggered by analysis at a contact control server or by CSR click selection of messages to be sent to a virtual contact center requesting issuance of information such as web pages to cognizant personnel.

28 Claims, 4 Drawing Sheets

VIRTUAL CONTACT CENTER WITH FLEXIBLE STAFFING CONTROL

RELATED APPLICATIONS

This application is a continuation-in-part application with priority based on earlier applications:

(i) M. J. Foladare, et al, entitled Virtual Call Center, Ser. No. 08/933,518, filed Sep. 18, 1997; now U.S. Pat. No. 6,049,602 and (ii) M. J. Foladare, et al, entitled Method and System for Providing Communication Control Functionality at a Remotely Located Site, Ser. No. 09/318,015 filed May 25, 1999.

The cited parent applications are assigned to the same assignee as the present application, and are hereby incorporated by reference as if set forth in their entirety herein.

In addition, the present application is related to the following applications filed on the same day as the present application; these applications are owned by the same assignee as the present application and are hereby incorporated by reference as if set forth in their entirety herein.

(iii) Control of Merchant Application by System Monitor in Virtual Contact Center;

(iv) Virtual Contact Center with Enhanced Language Capabilities;

(v) Enhanced Agent Authentication in Virtual Contact Center;

(vi) Virtual Contact Center Serving Public Transaction Terminals.

FIELD OF THE INVENTION

The present invention relates generally to the field of communications systems. More particularly, the present invention relates, in one aspect, to communications contact centers, including distributed or virtual call center functionality. Still more particularly, aspects of the present invention relate to virtual contact centers incorporating systems and methods for flexible staffing control, illustratively employing paging or other alerting functionality.

BACKGROUND OF THE INVENTION

Previous patent applications (i) and (ii) cited above, describe network-based interaction between calling parties, a call control server, a merchant server and one or more agents or customer service representatives (CSRs), which CSRs may be distributed over a number of locations remote from the customer and servers. Using high speed data networks, including the Internet, and/or the public switched telephone network (PSTN) customers contact CSRs in a controlled manner, with sufficient information available at CSR stations to answer customer questions, receive customer orders, or otherwise to serve customer needs. Such network arrangements are referred to as virtual call centers.

In some cases, a customer will originate a telephone call that is extended to a CSR exclusively over the PSTN, but under the control of the call control server. In other cases, a customer may be in controlled contact with a CSR exclusively over a data connection, and in other cases contact between the customer and CSR will include both a data network portion and a PSTN portion. Callback techniques, by which calls are originated by a CSR in response to a contact made by a customer to a merchant location over a data link, prove attractive to customers for some merchant applications. Using well-known voice-over-IP (VOIP) techniques, a voice call may be carried over a data network for all or part of its extent.

Network controls to enhance network and transaction security typically include voice and CSR data terminal login procedures, and selective dissemination of merchant and control pages to CSRs and customers. Provision is readily made for CSRs to login and logoff at the beginning and end of a work shift, and to accommodate periodic CSR breaks. Additionally, when customer calling rates are not sufficient to keep scheduled CSRs occupied, the earlier-described systems and methods provide flexibility in temporarily releasing CSRs to pursue other activities. Because CSRs may be working from home or other non-traditional workplaces, such releases often prove very attractive to CSR personnel.

While the term customer is clearly appropriate for network-based sales transactions using the described techniques, the term applies equally well when callers seek information, assistance and other services as well. Thus, for example, the prior teachings of incorporated patent applications (i) and (ii) will prove useful in providing library and other reference and consulting functions, in emergency and disaster applications, in political and other polling applications and a host of other applications. Incorporated patent applications (iii) through (vi) cited above likewise further illustrate (but by no means exhaust) contexts and services to which the prior inventive teachings may be applied. Simplicity of presentation dictates that the present description be based on an illustrative sales transaction context, i.e., the merchant will be assumed to be a supplier of goods or services. Those skilled in the art will recognize that the present inventive systems, techniques and principles will also apply to many other particular contexts. The term merchant will therefore be understood to include many non-merchant contexts, e.g., emergency service call centers.

Problems to be Solved

Perceived quality of customer service for call center transactions depends, in part, on the time a customer is required to wait for contact with a CSR, perhaps after having browsed a merchant web page that raised questions that are to be resolved before placing an order. However, if customer calling rates exceed expectations, or holding times for calls vary substantially from period to period in excess of norms, customers may be required to wait an inordinate period of time to reach a CSR. Waiting beyond a reasonable period often proves exasperating to callers, thus resulting in hang-ups and corresponding lost sales. Likewise, though prior systems provide for supervisor intervention at appropriate times, the number of occasions requiring supervisor attention may on occasion exceed the capacity of available supervisors—again resulting in delays, frustration and possible lost business. Moreover, some contexts, such as call centers providing technical or business support for merchant products and services, may require the availability of highly skilled technical or business experts to treat unusual problems.

The availability of such additional CSRs, supervisors and experts proves especially difficult to schedule in the overall context of a distributed or virtual call center. These difficulties are exacerbated by network failures requiring substitution of CSRs in unaffected regions, and by unusual customer calling rates induced by external unpredictable circumstances. In addition, absenteeism due to illness, severe weather or natural disasters may place unusual stress on normal personnel schedules.

Though virtual call center schedules may be known to a manager or shift supervisor, the degree to which all scheduled CSRs for a particular shift have logged-in may prove difficult to manage for a supervisor who has call monitoring and other management responsibilities. Further, a CSR who has failed to login as scheduled may not be available for the entire shift, or may simply be tardy, perhaps due to temporary traffic conditions or the like.

In another aspect, a calling customer may have a strong preference for interacting with a particular CSR, even if it requires some waiting for that CSR to become available. But when the desired particular CSR is not scheduled for current availability, is temporarily logged-off for a break, or is unavailable for other temporary reasons, the customer may defer or cancel interaction with the merchant system or application—again resulting in a lost business opportunity.

Thus an unfulfilled need exists for methods and systems for quickly mobilizing additional (or particular) available personnel when demands placed on a virtual call center exceed available personnel resources.

SUMMARY OF THE INVENTION

Limitations of the prior art are overcome and a technical advance is made, and the above-cited and other problems are solve in accordance with the present invention described in illustrative embodiments herein.

In one aspect, page and connect functionality is incorporated into virtual call center system operations to permit logged-off customer service representatives (CSRs), supervisors and other needed personnel to be alerted to a need to logon to the system to meet an unanticipated or specialized caller demand. Paging, messaging and calling resources of a wireless telephone system, among others, are alternatively applied in the alerting or notification process.

Matching at a call control center of existing calling levels or other conditions to predetermined criteria, e.g., failure to login at an assigned time, or specified network conditions (such as length of customer queues), illustratively triggers a command for an alerting message to one or more logged-off CSRs. Results of follow-up testing for matches causes alerting messages to be renewed, redirected or canceled.

Recognition by a logged-on CSR or supervisor of unusual call requirements or emerging network, technical or business conditions requiring supervisory input or increased participation by traffic or subject matter specialists illustratively motivates manual selection of messages to be sent to a virtual call center requesting issuance of pages (or cellular phone communications or other alerting messages) to cognizant personnel. For this purpose, a call control server advantageously maintains a database roster of on-call supervisors and specialists not presently logged-on.

Standard computer graphical user interfaces (GUIs) are employed to allow rapid selection of individuals or groups to be identified and alerted by paging techniques or otherwise.

Embodiments of the present inventive solutions will find application in contexts other than virtual call centers. For example, persons who are traveling or otherwise working from a virtual office will avail themselves of on-call network connection using present inventive techniques. To the extent that virtual call centers are associated with voice contacts by customers or others, the present invention further extends virtual call center techniques to non-voice contacts, e.g., when customer and other contacts are sought to be made via IP or other messaging techniques. Accordingly, the present invention provides for alerting of individuals and groups for purposes of handling voice or non-voice contacts. Thus, the present inventive techniques provide alerting in virtual contact centers or other virtual contact contexts—such as the above-noted virtual office contexts.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION

Illustrative System Overview

Figure 1:
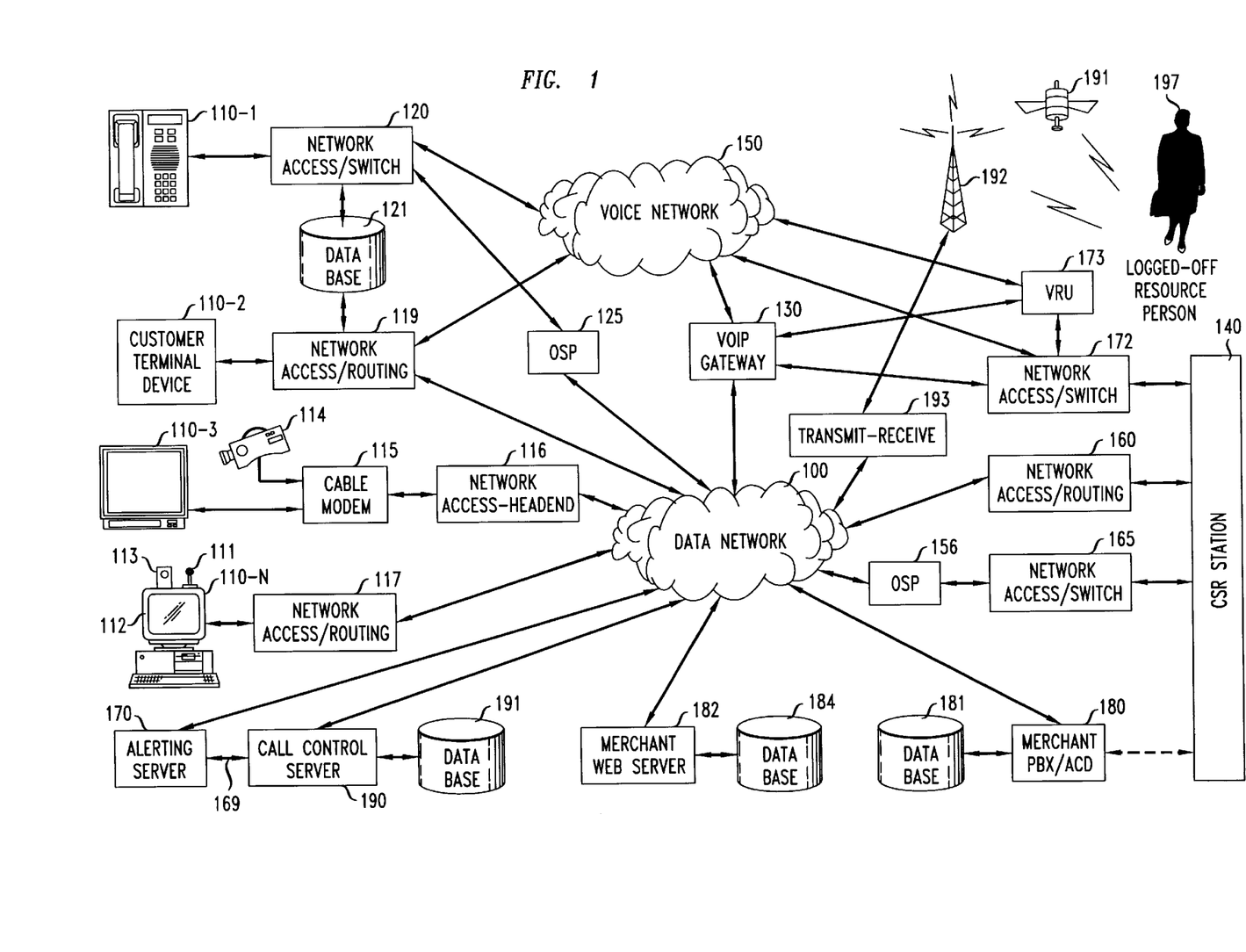
FIG. 1 is an overall view of a network-based call center system including elements of an illustrative embodiment of the present invention.

FIG. 1 shows an illustrative network-based call center system including an illustrative embodiment of the present invention. That system is based generally on the teachings of the incorporated applications (i) and (ii), but also includes elements for achieving current inventive features.

More particularly, FIG. 1 shows a plurality of customer terminal devices 110-i, i=1, 2, ..., N, interacting through a voice network 150 and/or a data network 100 with one or more CSR stations (an illustrative one of which is identified as 140), a web merchant web server 182, and a call control server 190. The "voice" network 150 is typified by the PSTN, or portions thereof, though it will be recognized that modem and other data signals routinely traverse such voice networks.

Illustrative customer terminal devices for use in the system of FIG. 1 include telephone station equipment 110-1. This telephone station equipment is shown connected through a network access device, including, as appropriate to the caller, a PBX or other switch (or other access device, including dedicated line/trunk facilities) 120 providing access to network 150, and, via online service provider (OSP) 125, to data network 100. Switch/access device 120 illustratively is provided access to a network database 121 for, among other purposes, obtaining routing information, as for routing 8xx calls.

Another customer terminal device shown in FIG. 1 is an interactive video arrangement including a television or other display 110-3 (including loudspeakers) and video camera (including audio pickup) 114 connected through an illustrative cable modem 115 to a network access device, typically a cable head end system 116, to data network 100. It will be recognized by those skilled in the art that in one configuration, some or all of the combination of display 110-3, camera 114 and modem 115 may be integrated as a single device adapted for communicating over a broadband data network, such as the Internet.

Terminal 110-N shown in FIG. 1 is a personal computer or workstation having typical processor, memory and input/output facilities (including a sound card and associated software), and typically running an operating system with a graphical user interface and a browser or similar software for accessing, downloading and displaying World Wide Web (WWW) pages or other materials using the well-known IP protocol. Like terminal 110-3, terminal 110-N will typically include audio and video input devices, represented by microphone 111 and video camera 113, and normal audio output (not shown). Add-in software such as QuickTime from Apple Computer Corp. and a current version of Real-Player from RealNetworks, Seattle, Wash., provide real-time video and audio communication between terminal 110-N and IP network devices. Other commercially available software, advantageously compatible with ITU Recommendation H.323 also proves useful in providing real-time multimedia communications between devices connected to network 100.

Terminal 110-N, with its peripherals, gains access to data network 100 through an appropriate network access/routing device 117, which may be a modem for voice grade lines through an OSP or other access service, or a broadband access device such as an ADSL or cable modem through an appropriate network access connection.

To emphasize that customer terminal devices 110-i are not limited to traditional computer and telephony devices, FIG. 1 includes customer terminal device 110-2. Device 110-2 may include any or all of any of the other devices 110-i and, in addition or instead, may include sensors of many kinds, whiteboard input/output devices or other input/output devices. Similarly, customers may access CSR personnel using portable handheld devices such as cellular telephones and portable computers and other Internet access devices. In each case access to one or more data networks, such as network 100, or a voice network, such as 150 in FIG. 1, is accomplished using well-known access interconnection devices and media appropriate to the customer terminal device used. As shown in FIG. 1 a network access device such as 119 in FIG. 1 will, in some applications, employ a network database for additional routing or control purposes.

A single illustrative CSR station 140 is shown in FIG. 1 to avoid unnecessary clutter in that figure. However, it will be recognized that, in general, a plurality (often many) such CSR stations will be logged-in through data network 100 and, in appropriate circumstances, voice network 150 for purposes of voice and/or data communication with one or more customers at customer terminal devices 110. The incorporated patent applications (i) and (ii) describe appropriate login procedures that prove useful in authenticating both the CSR station (in the form of a computer authentication and/or telephone authentication) and the CSR him/herself. While CSR station 140 usually includes at least a telephone station and a computer/workstation generally of the types used by calling customers, it will be understood that other computational or communications devices, including those available to calling customers, may be available at a CSR station as requirements dictate.

Access by CSR station 140 to the network 150 is illustratively accomplished through a network switch, such as provided by a local access carrier (LEC). Such a switch, shown as 172 in FIG. 1 may access a database like that shown as 121 in FIG. 1. Thus, for example, station 140 may be part of a network-based virtual private network (VPN) defined and controlled by information stored in such a network database. The network database will be incorporated into switch 172 in appropriate cases.

Also shown connected to switch 172 is a voice response unit (VRU) 173 of standard design for generating voice messages for delivery to calling (or called) customers. Thus, for example, a caller to an 8xx number seeking connection to a CSR will often be asked to key, speak or otherwise indicate one of a plurality of items of identifying or selecting information—such as a class of products or a subset of services (e.g., technical support). A VRU message may, in appropriate cases be sent in response to a CSR-selection, e.g., an item selected on a merchant form or a clickable button on a CSR computer screen. A call control server 190 (to be described below) may also command the VRU to function in like manner.

CSR station 140 may connect to network 100 directly through a router or other network edge device shown as 160 in FIG. 1. Alternatively station 140 may access data network 100 through a dialup or other access arrangement or switch (shown as 165 in FIG. 1) and further through an OSP or other access service shown as 156 in FIG. 1. OSP 156 may, for example, include facilities provided by AT&T Worldnet (sm) Service.

In addition, network switch 172 may provide access by CSR station 140 to data network 100 (or vice versa) for voice communications by routing a call through a voice over Internet Protocol (VOIP) gateway well known in the art and shown as 130 in FIG. 1. Once a voice call from a CSR station enters data network 100 it may be delivered to a customer terminal in a form suitable to that terminal device. Thus, for example, voice data packets from the call may be routed to another (or the same) VOIP gateway for delivery over voice lines to a customer. See, for example, D. Minoli and E. Minoli, Delivering Voice over IP Networks, John Wiley & Sons, 1998.

Also shown in FIG. 1 are merchant PBX and Automatic Call Distributor (ACD) 180 connected to data network 180. This switch/ACD combination is well known in the art as the means usually employed in locally arranged or locally networked CSR stations to which an ACD distributes incoming calls. Database 181 is conveniently shown connected to merchant PBX/ACD 180 for purposes of providing customer and account information as required. Thus, depending on proximity to merchant PBX/ACD CSR station 140 may, if appropriately located with respect to merchant PBX/ACD 180 gain access to networks 100 and 150 (and to required accounting and related customer data) through such a merchant PBX/ACD. As noted above, CSR station 140 may be one of many similarly situated, though one or many other CSR stations may be distributed at locations geographically remote from a merchant PBX/ACD and each other. Thus, CSR station 140 is shown connected to merchant PBX/ACD 180 by broken lines; in some cases the indicated path will exist, while in others any such required voice or data exchanges are accomplished through data network 100, including VOIP connections thereto. The indicated broken-line path represents one or more voice lines, broadband links or other communications paths as appropriate to a particular circumstance.

As described in incorporated patent applications (i) and (ii), control of (among other things) calls to CSRs is accomplished largely by a call control server 190. Call control server 190 conveniently either includes or is in contact (directly or through a network) with a VRU, such as VRU 173 to direct the issuance of voice messages to calling customers. Call control server 190 also interacts with CSR station 140 for authentication of the user and computer, as is described in the incorporated patent applications (i) and (ii). Database 191, shown connected to call control server 190, is conveniently used to store and access information relating, inter alia, to CSRs, supervisors, consultants and other related personnel- and the logged-in (or not) status of each.

Also shown connected to data network 100 in FIG. 1 is merchant web server 182 for making available online information, including merchant web pages, and other information that may be of use in conducting business online and in cooperation with CSRs. Call control server 190 advantageously interacts with merchant web server 182 to select, authenticate and otherwise control access to merchant information and CSRs for facilitating business on behalf of the merchant. Call control server 190 also advantageously interacts with merchant PBX/ACD 180 both in respect of controlling and coordinating call distribution to CSRs and others, and in respect to paging and related functions in some applications.

While shown independently connected to data network 100 in FIG. 1, merchant web server 182, merchant PBX/ACD 180 and call control server 190 (or some combinations of them) may be otherwise linked by a local area network (LAN), wide area network (WAN) or other network. In some cases merchant web server 182 may act as a front end for a call control server, e.g., a selection by a customer on a page downloaded from a merchant server may trigger one or more messages to a cognizant call control center from the merchant web server. It will be recognized that two or more of the merchant web server 182, merchant PBX/ACD 180 and call control server 190 may be combined in a multi-function network device in some embodiments of the present invention.

Of course, a call control server 190 can perform the same or related functions for each of a plurality of merchants, and each of a plurality of not necessarily mutually exclusive groups of CSRs. Thus, some CSRs may be qualified (or authorized) to work on behalf of two or more merchants, while others may not. In any event, call control server 190 is advantageously arranged to deliver ("push") web pages or other organized information to appropriate customers, CSRs and others (supervisors, specialists, etc.). It may prove useful in some applications to have separate (distributed) call control centers if appropriate for call-volume or geographical reasons, or for purposes of segregating calls associated with a particular merchant.

Staffing-Flexibility Functionality

To provide enhanced staffing flexibility in response to changing system needs, the system of FIG. 1 is advantageously augmented, in accordance with one embodiment of the present invention, with an alerting server 170 connected to data network 100. In one implementation, alerting server 170 (also sometimes referred to as a paging/cellular server) is connected (by permanent trunk/line facilities or over a LAN) to call control server 190 over link 169. Alternatively, communications between call control server 190 and alerting server 170 is in whole or part through messaging over network 100. In appropriate cases, two or more of alerting server 170, merchant web server 182, merchant PBX/ACD 180 and call control server 190 may be combined two varying degrees.

Alerting server 170 illustratively receives paged party identification information along with an alerting message, such as a request to place a telephone or online call to an identified scheduling or supervisory person or call control server such as server 190. Such alerting messages are illustratively paging messages sent over well-known paging facilities. In particular, preparation and delivery of paging messages is well known in the art as described, for example, in U.S. Pat. No. 5,745,689 to J. Yeager, et al, issued Apr. 28, 1998. In the present context, pages (or other alerting messages) are, of course, directed to logged-off CSRs, supervisors or other personnel whose participation in the virtual call center system of FIG. 1 is requested. Other techniques generally useful in employing alerting methodologies will be found in co-pending U.S. patent application Ser. No. 09/473954 entitled Method and System for Identifying Location of User to Telecommunications Network, filed Dec. 29, 1999 based on a provisional application filed Dec. 29, 1998. U.S. patent application Ser. No. 09/473954 is hereby incorporated by reference and considered set out in its entirety herein.

It will be recognized that paging services are often provided as adjunct services to normal voice or data cellular telephone services. A page directed to a CSR who is a subscriber to cellular wireless services having included paging features will be reached in substantially the same manner as a paging-only subscriber. One so-called page and connect approach to reaching a called party by page and having a voice call returned in response is described in U.S. Pat. No. 5,703,930 issued Dec. 30, 1997 to R. A. Miska, et, al. Other techniques, involving bridging of so-called return calls from a paged party, are described in U.S. Pat. No. 5,805,991 to M. J. Foladare, et al, issued Sep. 8, 1998.

Similarly, many alternative or more elaborate messaging services may be controlled by call control server 190 to originate a wired or non-wired connection to a logged-off resource person (CSR, supervisor, specialist or other virtual call center person). Thus, for example, portable, handheld or wearable devices with wireless facilities of various designs and capabilities permit a range of simple or complex messaging, one- or two-way voice, Internet or other network-enabled, text or graphics and other levels of communications with at large subscribers. Though paging represents a simple means of alerting needed at-large resource persons, automatic dialing capabilities will, in appropriate cases, be employed in server 170 to deliver a pre-recorded voice message to a CSR who is a normal cellular subscriber. Other alerting techniques will include so-called instant messaging techniques available over the Internet or other data network, whether connections are wired or wireless.

For purposes of simplifying the present description, alerting mechanisms for sending alerting messages to CSRs or others will be primarily presented in terms of paging, though it will be recognized that other messaging techniques may be preferable in particular applications of the present inventive contributions. Thus, when paging or paging/cellular messages are referred to, it will be understood that any messaging technique may be used to contact a resource person who is not logged in.

The output of alerting server 170, whether a paging message, cellular telephone call or other alerting communication, is delivered to an appropriate distribution system, represented in FIG. 1 by illustrative wireless transmit/receive land station 193 connected to antenna 192. Corresponding ground-based facilities (not shown) are employed for providing alerting messages and the like to satellite 191 for delivery to a sought after at-large logged-off resource person, represented as 197 in FIG. 1. Though elements 191, 192 and 193 are commonly associated with wireless messaging links to a CSR or other person, other access routes, wired as well as wireless, will be employed in appropriate cases. Thus, when a CSR or other person to be alerted is at another location (but not logged on to the virtual call center or relevant server), such links to the other location as may exist can be employed as well. So, for example, if a logged-off resource person (CSR, virtual office worker, etc.) is nevertheless logged in to an information service having e-mail, instant messaging or other messaging facilities, then those facilities (wired or wireless) may be used to send and receive the required alerting message. As will be described in more detail below, the described calling, paging or other messaging operations may be directed not only to an individual, but also to an identified group substantially simultaneously.

In operation, call control server 190 determines the existence of conditions or trends at call control server 190 or elsewhere in a call center system—including a call center system having at least some distributed (virtual call center) locations. For this purpose, call control center 190 maintains certain database materials and monitors conditions relevant to call center operation to form messages, as needed, to alert logged-off personnel. Certain of these facilities, and resulting interaction with network and alerting server(s) will be discussed below with reference to FIG. 2.

For present discussion purposes, CSR station 140 in FIG. 1 is taken as a virtual call center CSR station which is not logged-in, and for which the associated CSR (which, unless otherwise stated, will be understood for particular cases to be a CSR, supervisor, specialist or other resource person) is at large (not presently engaged in call center activity), but in possession of a pager or other suitable portable device for receiving alert signals. In at-large status, a CSR may be at or in the vicinity of the CSR station, or at some distance. The CSR may be in any of a plurality of readiness states, such as on break, on call, scheduled for present call center activity (though not logged on), on a scheduled day (or longer) off period or others. It is assumed that any number of other CSRs (not shown in FIG. 1) remain logged-on.

Figure 2:
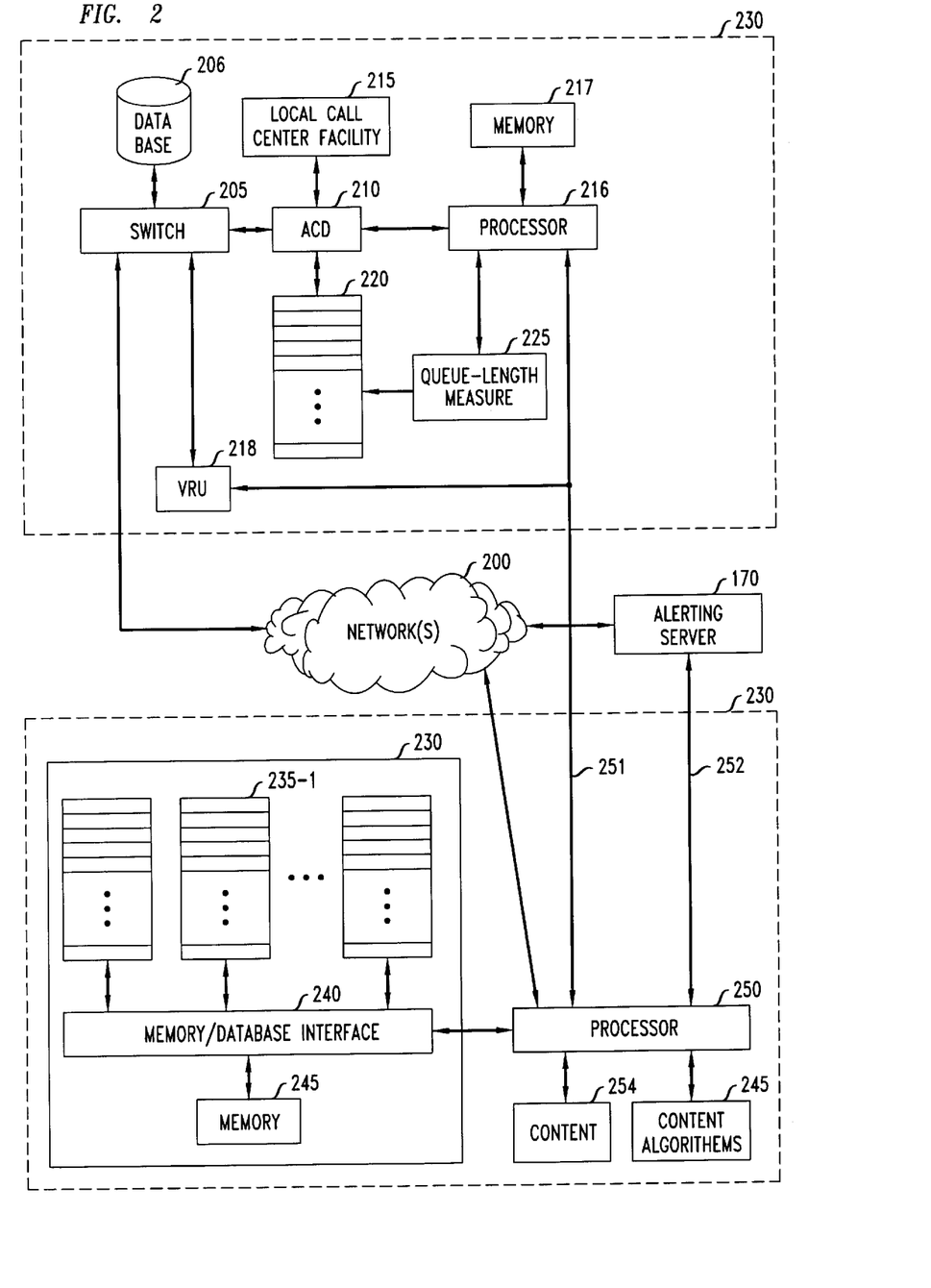
FIG. 2 shows illustrative facilities for maintaining status for personnel resources and for generating illustrative paging signals to identified individuals or groups.

Turning then to FIG. 2, portions of call control center 190 are elaborated as block 230 shown connected to alerting server 170, portions of merchant PBX/ACD 180 (grouped in FIG. 2 as 207), and network(s) 200. More specifically, switch 205 and ACD 210 are elements (previously associated in element 180 and shown in FIG. 1 as connected to network 100) for performing routing of calls to or from CSRs based on control information supplied, at least in part, by call control server 190. As reflected in FIG. 2, switch 205 typically comprises a merchant PBX, of a type well known in the art, connected to one or more networks 200. In the overall view of FIG. 1, the connection of PBX 205 is to data network 100, but such PBX connection will, in appropriate cases connect as well or instead to a voice network such as network 150 in FIG. 1. Similarly, networks 200 may include a LAN or other separate network connecting one or more of merchant web server 182, call control server 190 and merchant PBX/ACD 180. Such LAN or other network links are illustratively shown as links 251 and 252 in FIG. 2.

ACD 210 shown in FIG. 2 is likewise of standard design and includes local call center facilities 215 when desired or required to complement virtual CSR stations. ACD 210 includes or interoperates with call queue 220 and associated queue-length measurement device 225. The latter is shown interconnected with processor 216, which is shown with its associated memory 217. Queue-length measurement element 225 will, in some cases, be a software routine running on processor 216 in response to queue data maintained routinely in ACD 210. Queue length is a useful system status indicator for initiating activities of alerting server 170, as will be described in more detail below. Database 206 and VRU 218 advantageously complement switch 205. Database 206 conveniently maintains routing and other control information for the operation of switch 206, and VRU 218 operates under the control of one or more processors in PBX/ACD combination 207 (processor 216), or in call control server combination 230 (processor 250) to provide voice response services during call processing. In accordance with one aspect of the present invention, VRU provides voice announcement/messaging capabilities to alerting server 170, illustratively through switch 205 and networks 200, or through processor 250. In appropriate cases, alerting server 170 and/or processor 250 may include VRU facilities substantially similar to those shown at PBX/ACD element 207.

Call controller server elements grouped as 230 in FIG. 2 include processor 250 interacting through a memory/database interface 240 with database elements 235-i and memory 245. In some implementations, some or all of database elements 235-i may be combined in a common database system, and may share memory facilities of memory 245. The database elements 235-i (for some integer range of i) correspond to respective tables used by processor 250 in formulating control signals for initiating, updating and terminating pages, cellular calls or other communications to at-large CSRs.

In overall operation, processor 216 gathers traffic information present at ACD 210, such as call queue length, changes in calling patterns, call holding times or other such information available at an ACD and forwards such information to processor 250 in call control server grouping 230. (Call control server 190 in FIG. 1 will typically include hardware and software elements not shown in the group of elements 230 in FIG. 2, but described in incorporated patent applications (i) and (ii).) Processor 250 employs such traffic information from ACD 210 and information in one or more tables 235-i to generate paging/calling (or other alerting) instructions for application to alerting server 170.

Information maintained in tables 235-i typically includes a roster of all CSRs, as well as logon information (such as certificate number, password(s), PSTN calling number, IP address if any), scope of activities (such as merchants with which the CSR is associated and supervisory or consulting responsibilities), paging address (if any), cellular calling number (if any), reach information for any other personal communications devices, links or numbers, if any. Additionally, tables 235-i will indicate activity status for each of the CSRs—such as logged-on, on-call, not scheduled, etc. Based on predetermined preferences of system operators and CSRs, as well as any contractual or less formal arrangements between system operators and CSRs, processor 250 determines any requirement for additional CSR (including supervisor, specialist and other personnel). When such a requirement is determined, processor directs alerting server 170 to generate appropriate contact initiatives.

When particular conditions arise in a virtual call center context, it proves desirable to send a page or other contact to more than one CSR at substantially the same time. For this purposes, it proves convenient to form groups of CSRs, each having some relevant skill set, availability or other characteristics in common. Then, when conditions requiring a number of additional CSRs to logon, a single command can be sent to alerting server 170 identifying the group to be alerted. Membership in such groups is advantageously included in one or more of database tables 235-i and accessed by processor 250 while executing one or more versions of contact algorithms 245.

The sets of rules or practices (the contact algorithm) used in making such contact determinations is reflected in FIG. 2 by the contact algorithms block 253. Also, message address/content block 254 in FIG. 2 represents predetermined message content to be included in particular alerting or contact messages. In some cases, as when a particular CSR (or group of CSRs) has (have) a relatively sophisticated personal information device, contact information may be relatively complete or complex, while in other cases a simple text message to a standard pager will simply instruct the recipient to login to the virtual call center. Many variations will readily be accommodated using the present inventive teachings. A multi-mode contact process may be included when appropriate to CSR alerting device capabilities. In such circumstances, a simple page may be complemented by a voice message originated by a VRU, such as VRU 218 in FIG. 2, or a VRU included at alerting server 170. Of course other message types, including tones or other audio messaging, graphic information of various kinds or any combination of them will be used, as circumstances require. For example, if a specialist associated with a virtual call center is at large in a noisy environment, graphic input information may be preferred for conveying relatively complex requirements.

While the preceding discussion anticipates call traffic information as part of a determination to generate contacts with at-large CSRs, such need will arise in some cases when traffic volumes are not presently abnormal or unanticipated. Thus, for example, if an some number of scheduled CSRs do not logon at predetermined times as anticipated, processor 250 may determine that a future bottleneck might appear, thus necessitating contacts with those CSRs who are scheduled but not logged on, as well as one or more at large CSRs. This determination will be made in some cases irrespective of current calling volume.

Thus, in accordance with one aspect of the present invention, a need for additional personnel resources can be pro-active, rather than merely reactive. Desirably, processor 250 will have available (in memory 245 or otherwise) a history of anticipated calling demands and corresponding required CSR resources.

Additionally, high calling levels arising from special circumstances, such as a broad-based advertising program, or sales promotions presented on a merchant web page on server 182, will be anticipated by increasing the normal staffing requirements. However, because such promotions may create demands for CSRs in excess of (increased) scheduled staffing, processor sensitivity to calling trends is advantageously subject to modulation, e.g., based on a special event parameter. Thus, if a sales promotion appears to be stimulating calling volume in excess of (enlarged) expectations, processor 250 can determine at an early stage to seek additional CSR resources.

Figure 3A:
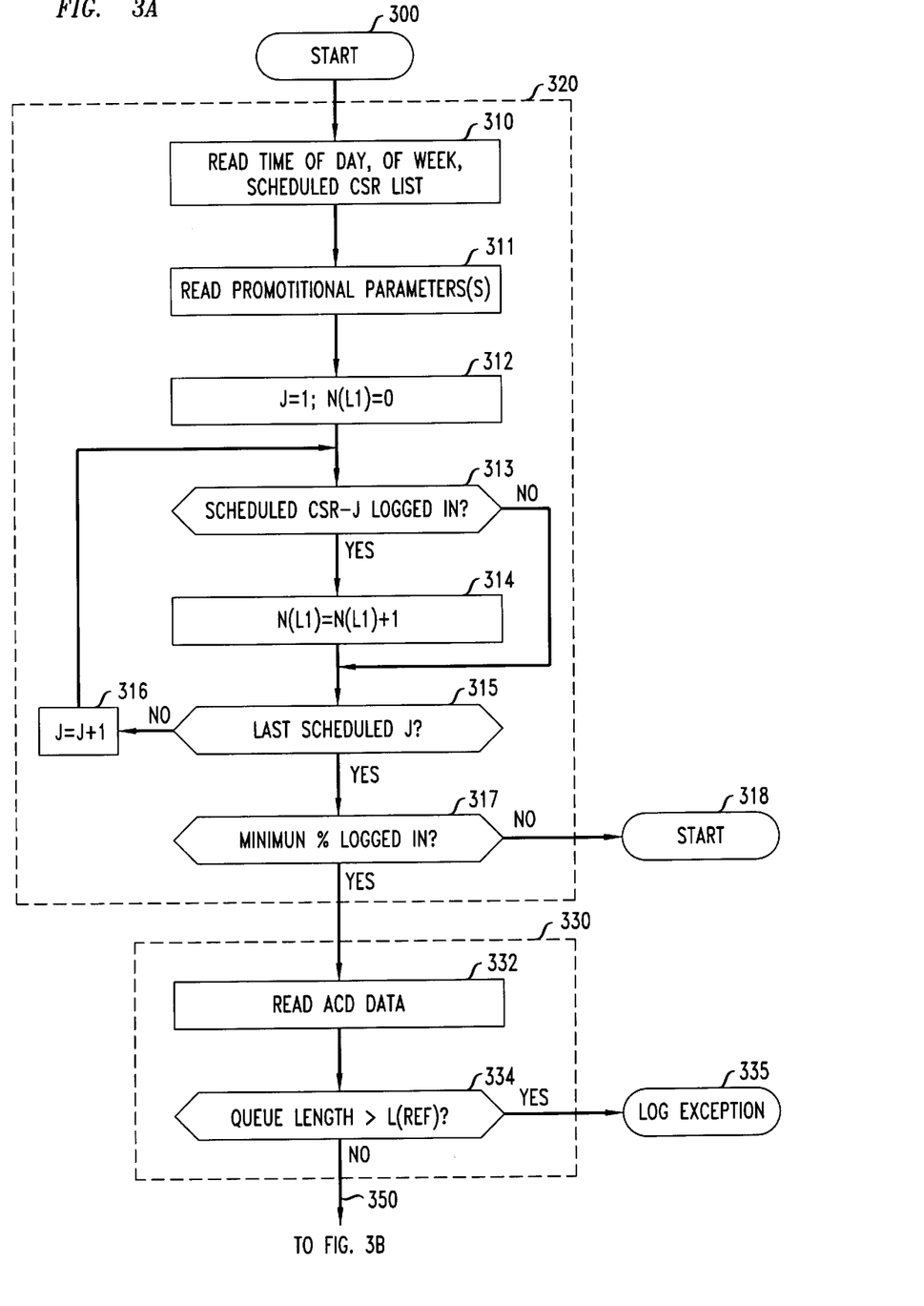
FIGS. 3A and 3B together form a flowchart representation of software executing in one or more network processors to achieve functions realized by embodiments of the present invention.
Figure 3B:
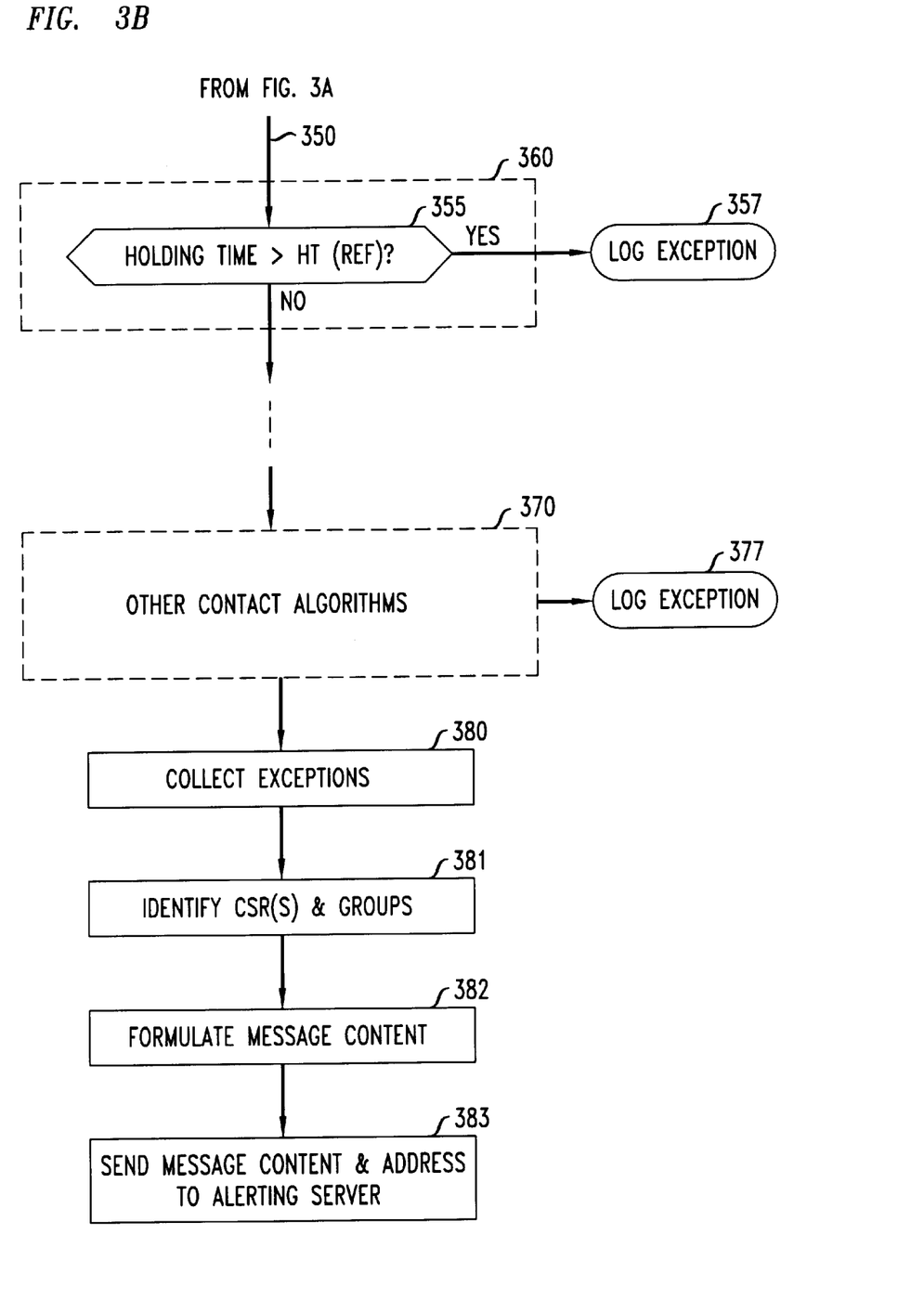

FIGS. 3A and 3B show typical processing steps performed at call server 170 by system elements grouped as 230 in FIG. 2. In particular, upon starting at block 300 in FIG. 3A, a first contact algorithm 320 is illustratively executed. A first step in algorithm 320 is reading time of day, day of week, the list of CSRs scheduled to be logged on, and other context data as required, as shown by block 310. When special circumstances, such as the promotional program cited above, parameters for modifying or sensitizing decision criteria will also be read, as shown at block 311 in FIG. 3A. Then calculation variables j (an index value for the set of CSRs currently scheduled to be logged on) is set to 1, and n(li), the number of CSRs actually logged on is set to zero.

At step 313 a test is made as to whether the jth CSR scheduled for service has actually logged on. If the test yields a positive result, the number of CSRs logged on is incremented, while no such incrementing is performed if the test at 313 yields a negative result. Test 315 tests for the end of the list of scheduled CSRs; if the end is not at hand, j is incremented by one and a return to step 313 is executed. After the entire list of CSRs scheduled for current service is read, a determination is made at test 317 as to whether an acceptable percentage (or number) of CSRs have actually logged on. If not, an exception is logged at block 318. It will be recognized that the acceptable percentage (or number) of CSRs actually logged on will generally be a function of promotional (or other special circumstance) parameter values.

Upon completion of execution of the algorithm 320 for logged on CSRs, it proves convenient in many cases to execute algorithm 330—testing for ACD queue length. For this purpose, ACD data (including queue length) is accomplished at block 332. Then, a test for queue length against a reference queue length l(ref) is made at block 334. If the queue length exceeds the acceptable l(ref) value, then an exception is logged at step 335. Again, it will be recognized that the value l(ref) may be subject to promotional parameter value.

Another illustrative contact algorithm 360 is shown in FIG. 3B (a continuation of the processing of FIG. 3A). This latter algorithm is a simple test for holding time for calls processed by ACD 205 in FIG. 2, illustratively in terms of an average holding time for a recent time interval. Many other contact algorithms appropriate to particular cases may be included in the contact algorithm processing, as represented by unspecified contact algorithm 370. It proves convenient to refer to such variables as call queue length, percentage of scheduled CSRs who are logged on, call holding times and other such variables relating to required or desired levels of staffing in a virtual call center as virtual call center state variables.

After all appropriate contact algorithms have been processed, it proves convenient to collect all exceptions that have been noted during such processing. as shown by step 380 in FIG. 3B. Block 381 corresponds to processing to identify appropriate individual or groups of CSRs to be contacted. In some cases (as for illustrative contact algorithm 320), the identified persons may merely be CSRs who are scheduled but not yet logged on. So, alerting messages sent to these latter CSRs is in the nature of a reminder—as may be appropriate in a relatively loosely knit group of CSRs. Other individuals or groups to be alerted may correspond to a stand-by individual or group. For example, a standby group may include a relatively large number of actual CSRs and one or more supervisors. In other cases, especially when specialist assistance is needed, or will soon be needed, a list of available specialists with identified skills or knowledge will be used. Because such specialist involvement may involve individuals of high skill levels and competing demands for time, specialist alerting may be done on a very selective basis, as will be known to system operators and others familiar with the merchant task at hand. It should be recalled that the CSRs (including supervisors and specialists) may supply any of a wide variety of services, not only the illustrative network-based sales of products and (routine) services.

After the addressee(s) of any alerting message has (have) been identified, the. form and content of the alerting message is determined, as indicated by step 382. Thus, whether the alerting message is a text-based page, a cellular call or page, a voice mail message, a graphic display message, or any other form is determined at step 383—based, in part, on the available device information stored in one of the tables 235-i containing CSR information. Likewise, the nature of the task that has arisen will shape the content of the message. If relatively routine additional call volume has occurred or is likely to occur, a message simply requesting a CSR to log on may suffice. In other cases, a more complete message indicating the likely nature or extent of desired involvement may be included in the message. If a high cost consultant is being alerted, some additional information regarding the duration of involvement and, perhaps, the nature of the problem to be handled will be warranted.

While the above-described embodiments reflect a fully automated alerting mode of operation, presently logged on CSRs may be an appropriate additional source of system input. Thus, if a CSR is in communication with a customer with special needs, that CSR may click on a merchant web page that is active on his/her computer screen to alert a supervisor or some special need or resource. Likewise, if a CSR, and especially a supervisor, detects some operational difficulty—such as a network difficulty or a web page error that should be clarified—then a request for the appropriate specialist effort can be entered in a contact algorithm that will give rise to an appropriate alerting message.

Though the above description of contact algorithms has emphasized the generation of control signals to a alerting server to alert at large CSRs, it will be understood that the elimination or moderation of conditions giving rise to such alerts will advantageously cause new control signals to cause alerting server 170 to generate override, or canceling messages to some or all of the prior recipients of alerting messages. Further, logged on CSRs may become aware of a resolution of a problem that had automatically (or by CSR button-clicking) caused an alert to be sent to one or more individuals. In this case, provision is conveniently made for a CSR button-clicked selection to trigger a message to call control server 190 to send canceling or override messages.

Of course, an existing resource problem may not improve, and may even worsen after an initial one or more alerts. In such case, provision is advantageously made in contact algorithms 245 to perform follow-up testing over a period of time regarding improvement or worsening of call center difficulties. So, for example, if a test made ten minutes after an initial alert for at large CSRs to logon, and if a required number have logged on, then the alert can be canceled automatically by the system. If the same or another initial alert has not caused satisfactory results, a repeated or enlarged alert (to a larger group of individuals) will advantageously be initiated. Of course, once a particular CSR has logged on, his/her status will be changed in the tables maintained by processor 250 in FIG. 2, so that a logged on CSR will not be alerted.

Some illustrative embodiments of the present invention contemplate contacts to a single paging or calling number (or a substantially parallel grouping of contact numbers or the like) to which an alert message is to be sent, it will be clear to those skilled in the art that, in appropriate cases, a sequential location process may be used. Thus, for example, a person-locating service of a type described, for example, in U.S. Pat. No. 4,313,035, issued Jan. 26, 1982 to D. S. Jordan, et al, or as practiced in present modifications and extensions of such services, may be used to reach a desired CSR. In accordance with an extension of such personal locator techniques in accordance with the present invention, a message delivered to a first called location will be followed after a predetermined time by a call/page to another location provided by the locator service, and so forth, until the identified CSR has logged in or some other event, such as the passage of a predetermined period of time, has occurred.

While server 170 has been illustratively referred to above as a paging/cellular server, it will be recognized that server 170 will, in some embodiments, be a server giving rise to alerting signals that are sent in whole or part by other wired or wireless means in such form as to permit reception by a CSR who is not logged on to a virtual call center. For example, server 170 may be a wireless LAN base station with message formulating capabilities. In the latter circumstance, an at large CSR may be within a building or campus and can receive alerting messages containing content sufficient to indicate a need to log in at a customary location or, if permitted by the call control server authentication procedure, from a nearby terminal or computer and/or, as appropriate, telephone station.

Though problems solved by the present invention are particularly relevant to virtual call center contexts, it will be recognized that other contexts involving mobile workers or those having a plurality of work locations will benefit from use of the present invention. Further, workers other than CSRs who are at large, or work at home or in other virtual office locations—such as those described in co-pending U.S. patent applications Ser. No. 09/370766, filed Aug. 8, 1999 and assigned to the assignee of the present application, and the above-incorporated application Ser. No. 09/318015—will employ the present inventive techniques to remain accessible to their employers, customers, clients, colleagues and others. The aforesaid application Ser. No. 09/370766 is hereby incorporated by reference and considered set out in its entirety herein. Accordingly, references to CSRs in the context of illustrative virtual call centers will in appropriate cases be understood to include other personnel not-logged-in to a particular network or server, but who are in demand based on conditions existing in or on such network or server. These personnel will include not only CSRs, multiple-location personnel, travelers and remotely located or in-the-field employees, but those at large personnel who—though not logged in—are reachable by appropriate alerting or messaging techniques.

The term virtual contact center should be understood to embrace such in-the-field, traveling or virtual office contexts, as well as illustrative virtual call center contexts described above and in some or all of the previously filed incorporated co-pending patent applications. Moreover, virtual contact center will be understood to include network-based systems, methods and techniques for processing voice and non-voice contacts, including instant messaging or other messaging contacts (such as e-mail contacts). The virtual contact center label is to be understood to apply whether customer or other contacts are referred to as calls, messages or otherwise.

Numerous and varied modifications and extensions of the present inventive teachings within the spirit of these teachings, and the scope of the appended claims, will occur to those skilled in the relevant arts.

What is claimed is:

1. In a network virtual contact center comprising a contact control server and at least one customer service representative (CSR) for serving contacts from customers, a method for alerting CSRs who are not logged on comprising identifying values for at least one virtual contact center state variable, when said identified values bear a predetermined first relationship to respective first predetermined values for at least one of said state variables, issuing a command for at least one communication to alert additional contact center resources.

2. The method of claim 1 wherein said at least one contact center state variable comprises a measure of CSRs logged-in to said contact control server, and said first predetermined value for said at least one contact center state variable comprises a measure of a scheduled number of CSRs logged-in to said contact control server.

3. The method of claim 1 wherein said at least one contact center state variable comprises a number of queued incoming contacts to said virtual contact center, and said first predetermined value for said at least one contact center state variable comprises an allowable value for the length of queued incoming contacts to said virtual contact center.

4. The method of claim 1 further comprising repeatedly comparing values of said contact center state variables that previously gave rise to a command for said communication, and canceling said command for said communication when said first predetermined relationship no longer exists.

5. The method of claim 1 further comprising repeatedly comparing values of said contact center state variables that previously gave rise to a command for said page, and modifying said command for said communication when a second predetermined relationship exists between said identified values and second predetermined values for said at least one contact center state.

6. In a network virtual contact center comprising a contact control server and at least one customer service representative (CSR) for serving contacts from customers, a method for augmenting available call center resources comprising identifying values for at least one virtual call center state variable when said identified values bear a predetermined first relationship to respective first predetermined values for at least one of said state variables, issuing a command for at least one communication to alert additional call center resources, said at least one call center state variable comprising a value signaled by a CSR to said call control server in a message identifying existence of a class of problems at a CSR location.

7. The method of claim 6 further comprising issuing a command at said call control server to an alerting server for said alerting server to send a communication to a logged off additional call center resource.

8. The method of claim 7 wherein said logged off additional call center resource is a call center supervisor.

9. The method of claim 7 wherein said logged off additional call center resource is a subject matter specialist.

10. A virtual contact center contact control server comprising means for receiving values for at least one contact center state variable, means for storing information relating to CSRs associated with said virtual contact center, said information comprising logged on/logged off state, identification for at least one mobile communications terminal, means for relating said received values for said contact center state variables to predetermined values, and means responsive to said means for relating for sending a command to an alerting server to generate a message to at least one selected logged off CSR.

11. The virtual contact center server of claim 10 wherein said means for sending comprises means for formulating content of said message, and means for forwarding said content and said identification information to said alerting server.

12. The virtual contact center server of claim 10 wherein said identification information comprises a network address for said mobile communications terminal and information relating to the communications capabilities of said mobile communications terminal.

13. The virtual contact center server of claim 10 wherein said means for relating comprises means for executing at least one contact algorithm and means for determining when said executing yields at least one predetermined relationship between said received values for said state variables and said predetermined values.

14. The virtual contact center server of claim 13 wherein said contact algorithms are subject to modification by said received values for said state variables.

15. The virtual contact center server of claim 13 wherein said contact algorithms comprise at least an algorithm relating contact queue length to a predetermined queue length.

16. The virtual contact center server of claim 13 wherein said contact algorithms comprise at least an algorithm relating the number of logged on CSRs to a desired number of logged on CSRs.

17. A method of operating a virtual contact center contact control server comprising receiving values for at least one contact center state variable, storing information relating to CSRs associated with said virtual contact center, said information comprising logged on/logged off state, identification for at least one mobile communications terminal, relating said received values for said contact center state variables to predetermined values, and sending a command to an alerting server to generate a message to at least one selected logged off CSR in response to said relating.

18. The method of claim 17 wherein said sending comprises formulating content of said message, and forwarding said content and said identification information to said alerting server.

19. The method of claim 17 wherein said identification information comprises a network address for said mobile communications terminal and information relating to the communications capabilities of said mobile communications terminal.

20. The method of claim 17 wherein said relating comprises executing at least one contact algorithm and determining when said executing yields at least one predetermined relationship between said received values for said state variables and said predetermined values.

21. The method of claim 20 wherein said contact algorithms are modified by said received values for said state variables.

22. The method of claim 20 wherein said contact algorithms comprise at least an algorithm relating contact queue length to a predetermined queue length.

23. The method of claim 20 wherein said contact algorithms comprise at least an algorithm relating the number of logged on CSRs to a desired number of logged on CSRs.

24. In a virtual network serving a group of persons, said virtual network comprising a network control server, less than all of said persons in said group being logged on to said control server, a method for selectively alerting persons in said group who are not logged on to said control server comprising identifying values for at least one network control server state variable, when said identified values bear a predetermined first relationship to respective first predetermined values for at least one of said state variables, issuing a command for at least one communication to alert at least a predetermined one of said persons who are not logged on.

25. The method of claim 24 wherein said at least one network control server state variable comprises a measure of persons in said group who are logged-in to said network control server, and said first predetermined value for said at least one network control server state variable comprises a measure of a scheduled number of persons logged in to said network control server.

26. The method of claim 1 wherein said at least one network control server state variable comprises a number of queued incoming contacts to said network control server, and said first predetermined value for said at least one network control server state variable comprises an allowable value for the number of queued incoming contacts to said network control server.

27. The method of claim 24 further comprising
repeatedly comparing values of said network control server state variables that previously gave rise to a command for said communication, and
canceling said command for said communication when said first predetermined relationship no longer exists.

28. The method of claim 24 further comprising
repeatedly comparing values of said contact center state variables that previously gave rise to a command for said communication to alert said at least a predetermined one of said persons who are not logged on, and
modifying said command for said communication when a second predetermined relationship exists between said identified values and second predetermined values for said at least one contact center state.

* * * * *